United States Patent [19]

Thaler et al.

[11] Patent Number: 4,737,303

[45] Date of Patent: Apr. 12, 1988

[54] SULFOMALEATION OF ORGANIC MOLECULES AND POLYMERS

[75] Inventors: Warren A. Thaler, Flemington; Stanley J. Brois, Westfield; Francis N. Ferrara, Dunellen, all of N.J.

[73] Assignee: Exxon Research and Engineering Company, Florham Park, N.J.

[21] Appl. No.: 911,761

[22] Filed: Sep. 26, 1986

Related U.S. Application Data

[63] Continuation-in-part of Ser. No. 809,030, Dec. 16, 1985, Pat. No. 4,652,600, which is a continuation-in-part of Ser. No. 778,269, Sep. 20, 1985, Pat. No. 4,587,304.

[51] Int. Cl.$^4$ ............................................. C16M 145/00

[52] U.S. Cl. ................................... 252/47.5; 525/284; 525/285; 525/291; 525/331.8; 525/331.9; 525/348; 525/353; 252/33; 252/33.4

[58] Field of Search ....................... 252/47.5, 33, 33.4; 525/284, 285, 291, 331.8, 331.9, 348, 353, 547, 583, 585, 572, 576

[56] References Cited

U.S. PATENT DOCUMENTS 4,587,304 5/1986 Thaler .................................. 525/285

Primary Examiner—William R. Dixon, Jr.
Assistant Examiner—Cynthia A. Prezlock
Attorney, Agent, or Firm—Richard E. Nanfeldt

[57] ABSTRACT

A covalently bonded reaction product of:
(a) a sulfomaleic anhydride adduct with an unsaturated hydrocarbon polymer; and
(b) a polar molecule containing at least one primary or secondary amino group.

7 Claims, No Drawings

SULFOMALEATION OF ORGANIC MOLECULES AND POLYMERS

CROSS-REFERENCE TO RELATED APPLICATION

This is a continuation-in-part application of U.S. Ser. No. 809,030, filed U.S. Pat. No. 4,652,600 Dec. 16, 1985, which in turn is a continuation-in-part application of U.S. Ser. No. 778,269, filed Sept. 20, 1985, now U.S. Pat. No. 4,587,304.

FIELD OF THE INVENTION

The present invention relates to novel organic compounds and polymers which are adducts of sulfomaleic anhydride, its isomers or derivatives, with unsaturated organic molecules wherein the novel products are produced by contacting sulfomaleic anhydride with an unsaturated organic compound to form the novel product. In particular, the unsaturated organic molecule can be a hydrocarbon polymer ranging in molecular weight from about 500 to about 10,000,000.

The resultant adduct of sulfomaleic anhydride and the unsaturated hydrocarbon can be further reacted with a polyamine, which will neutralize the sulfonic acid group, as well as covalently bond to the copolymer by reacting with the anhydride group. The amine salt can be converted to a metal salt by reaction with metallic bases.

BACKGROUND OF THE INVENTION

Various unsaturated hydrocarbon polymers have been reacted with maleic anhydrides to form a variety of maleic anhydride adducts of unsaturated hydrocarbon polymers. The reactivity of maleic anhydride with many unsaturated hydrocarbon polymers is poor and, in some instances, as for example with EPDM rubber, even employment of extensive heating is ineffective. Free radical reactions which graft maleic anhydride onto the unsaturated hydrocarbon polymer have been utilized as alternative routes. Free radical grafting leads to chain scission, crosslinking, grafting onto oils or other paraffinic solvents. The reaction of sulfomaleic anhydride with the unsaturated hydrocarbon polymer overcomes these aforementioned deficiencies in that the sulfomaleic anhydride can be reacted with the unsaturated hydrocarbon polymer at moderate temperatures in either the bulk or solution state without the employment of free radical initiators. Utilizing the resultant adduct of sulfomaleic anhydride with unsaturated hydrocarbons, polar molecules can be covalently bonded through the anhydride group by reacting the resultant adduct with a a polyamine compound and simultaneously therewith, or alternatively thereto, the sulfonic acid group of the resultant adduct can be neutralized with an organic amine, polyamine or metal counterion. In the case of neutralization of the sulfonic acid group the resulting adduct is an ionomer, a polymer which contains physical links, which is capable of being reprocessed.

SUMMARY OF THE INVENTION

One embodiment of this invention is the production of ion containing polymers (ionomers), especially sulfonate ionomers, by a non-sulfonation route. Another embodiment of this invention is the activation of maleic anhydride or its derivatives towards Alder "Ene" reactions or Diels-Alder reactions, such that polymers which have unsaturated sites will readily form adducts. In particular, polymers such as EPDM rubbers which do not undergo thermal reaction readily with maleic anhydride will now react facilely. Still another embodiment is the utilization of the anhydride functionality of the polymer adducts to covalently bond polar molecules, such as alcohols and amines, to the polymer molecule. Examples of such polar molecules are tetraethylene pentamine, polyethylene amine (PAM), N-amino propyl morpholene, etc.

Examples of sulfomaleic anhydride, its isomers and derivatives which are suitable for this reaction include, but are not limited to, the following:

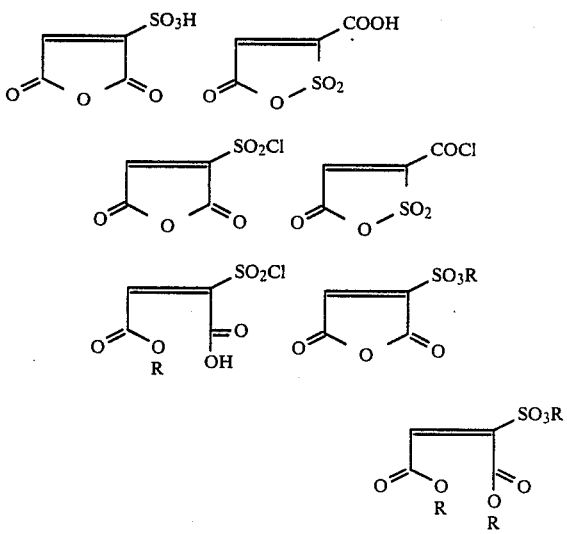

where R=H, alkyl, aryl, aralkyl, alkaryl, silyl, alkylsilyl, arylsilyl, aminoalkyl, polyether, amino ether, polyamine, etc.

The resultant adduct of sulfomaleic anhydride and the unsaturated hydrocarbon can be further reacted with: a polyamine which will neutralize the sulfonic acid group, as well as covalently bond to the copolymer by reacting with the anhydride group; a metal salt or simple amine which will neutralize the sulfonic acid group to form an ionomer.

The polymers of the instant invention are suitable for use as thermoplastic elastomers, dispersants, viscosity index (VI) improvers, drilling mud viscosifiers and deflocculents, adhesives, steric stabilizers, flow improvers, wax crystal modifiers, crystalline polyolefin modifiers, polymer blend stabilizers and other applications obvious to those skilled in the art.

These products are also useful for combined application, such as combined dispersant and VI improvers. Such materials are known as multifunctional VI improvers since they combine dispersant and viscosity improver characteristics into a single molecule. Multifunctional viscosity improvers are preferred since they can have better viscometrics than systems with lower molecular weight dispersants.

EPDM or EP polymers which have been reacted with maleic anhydride and subsequently modified by reacting the anhydride with polar molecules, such as polyamines, are of interest as multifunctional viscosity improvers. This is a relatively cumbersome reaction since EPDM and maleic anhydride are not reactive. Treating the two together in a hydrocarbon oil with radical initiators results in grafting of not only the polymer but also the oil. In contrast, the combination of sulfomaleic anhydride or its derivatives with EPDM is a rapid reaction which does not require initiators or extremely high temperature and does not involve the hydrocarbon solvent. The reaction also takes place readily in the absence of solvent upon admixture with the bulk rubber. Thus, an anhydride is present on the polymer molecule and can be reacted with polar molecules, such as polyamine, to produce a multi-functional viscosity improver.

GENERAL DESCRIPTION

The present invention relates to polymers which are sulfomaleic anhydride adducts with unsaturated hydrocarbons which are formed by reacting sulfomaleic anhydride with an unsaturated hydrocarbon in either the solution or the bulk state.

Sulfomaleic anhydride, which is represented by the formula:

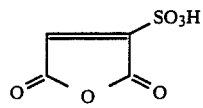

or formed by reacting maleic anhydride with sulfur trioxide. Besides sulfomaleic anhydride one can also employ sulfomaleic acid, sulfofumaric acid, sulfoacrylic anhydride and their various mono- and/or diesters, mono- and/or di-amides or imide derivatives.

The sulfomaleic anhydride is reacted with an unsaturated hydrocarbon polymer which is selected from the group consisting of EPDM terpolymers, EPR, polyisoprene, polybutadienes, Butyl rubber, styrene-butadiene and styrene-isoprene "random" and block copolymers, polybutenes, hydrocarbon resins, such as Escorez resins, etc. oligomers or polymers which have olefin functionality near the end of the chain are of interest. Reaction with sulfomaleic anhydride and any subsequent reaction with polar molecules, such as amine alcohols, polyols, polyamines, give a "diblock" with a hydrocarbon tail and a polar head. Such molecules include, but are not limited to, polyisobutene and polybutenes of various molecular weights. Vistanex, and Vistanex-J are examples of such polymers.

The expression "Butyl rubber", as employed in the specifications and claims, is intended to include copolymers made from a polymerization reaction mixture having therein from 70 to 99.5% by weight of an isobutylene and about 0.5 to 30% by weight of a conjugated multiolefin having from about 4 to 14 carbon atoms, e.g., isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000, especially about 10,000 to about 400,000, and a Wijs Iodine No. of about 0.5 to 50, preferably 1 to 15. The preparation of Butyl rubber is described in U.S. Pat. No. 2,356,128, which is incorporated herein by reference.

For the purposes of this invention the Butyl rubber may have incorporated therein from about 0.2 to 10% of combined multiolefin; preferably about 0.5 to about 6%, more preferably about 1 to about 4%, e.g., 2%.

Illustrative of such a Butyl rubber is Exxon Butyl 365 (Exxon Chemical Company), having a mole percent unsaturation of about 2.0% and a Mooney viscosity (ML, 1+3. 212° F.) of 40 to 50.

Low molecular weight Butyl rubbers, i.e., Butyl rubbers having a viscosity average molecular weight of about 5,000 to 85,000, and a mole percent unsaturation of about 1 to about 5%, may be sulfonated to produce the polymers useful in this invention. Preferably, these polymers have a viscosity average molecular weight of about 25,000 to about 60,000.

The EPDM terpolymers of the instant invention are low unsaturated polymers having about 1 to about 10.0 weight percent olefinic unsaturation, more preferably about 2 to about 8, most preferably about 3 to 7, defined according to the definition as found in ASTM-1418-64, and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,380,600, which are incorporated herein by reference. The preferred polymers contain about 40 to about 75 weight percent ethylene and about 1 to about 10 weight percent of a diene monomer, the balance of the polymer being propylene. Preferably, the polymer contains about 45 to about 70 weight percent ethylene and about 1 to about 10 weight percent of a diene monomer, the balance of the polymer being propylene. Preferably, the polymer contains about 45 to about 70 weight percent ethylene, e.g., 50 weight percent, and about 2.6 to about 8.0 weight percent diene monomer, e.g., 5.0 weight percent. The diene monomer is preferably a nonconjugated diene.

Illustrative of these nonconjugated diene monomers which may be used in the terpolymer (EPDM) are 1,4-hexdadiene, dicylcopentadiene, 5-ethylidene-2-norbornene, 5-methylene-2-norbornene, 5-propenyl-norbornene and methyl tetrahydroindene.

A typical EPDM is Vistalon 2504 (Exxon Chemical Company), a terpolymer having a Mooney viscosity (ML, 1+8, 212° F.) of about 40 and having an ethylene content of about 50 weight percent and a 5-ethylidene-2-norbornene content of about 5.0 weight percent. The $\overline{M}_n$ as measured by GPC of Vistalon 2504 is about 47,000, the $\overline{M}_v$ as measured by GPC is about 145,000, and the $\overline{M}_w$ as measured by GPC is about 174,000.

Another EPDM terpolymer, Vistalon 2504-20, is derived from Vistalon 2504 (Exxon Chemical Company) by a controlled extrusion process wherein the resultant Mooney viscosity at 212° F. is about 20. The $\overline{M}_n$ as measured by GPC of Vistalon 2504-20 is about 260,000, the $\overline{M}_v$ as measured by GPC is about 90,000, and the $\overline{Md}_w$ measured by GPC is about 125,000.

Nordel 1320 (DuPont) is another terpolymer having a Mooney viscosity at 212° F. of about 25 and having a 53 weight percent of ethylene, about 3.5 weight percent of 1,4-hexadiene, and about 43.5 weight percent of propylene.

The EPDM terpolymers of this invention have a number average molecular weight ($\overline{M}_n$ as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 670, more preferably about 10 to about 50, most preferably about 15 to about 40. The $\overline{M}_v$ as measured by GPC of the EPDM terpolymer is preferably below about 350,000 and more preferably below about 300,000. The $\overline{M}_w$ as measured by GPC of the EPDM terpolymer is preferably below about 500,000 and more preferably below about 350,000.

Other suitable olefin polymers include polymers comprising a major molar amount of $C_2$ to $C_5$ monoolefins, e.g., ethylene, propylene, butylene, isobutylene pentene-1, octene-1, etc. The polymers may be homopolymers, such as polyisobutylene, as well as copolymers of two or more such olefins, such as copolymers of ethylene and propylene, butylene and isobutylene, propylene and isobutylene and the like. Preferably these polymers will contain some diene so as to provide residual unsaturated sites.

The olefin polymers will usually have number average molecular weight within the range of about 750 and about 200,000, more usually to about 20,000. Particularly useful olefin polymers for dispersant additives have number average molecular weights (Mn) within the range of about 900 to about 2,000, with approximately one terminal bond per polymer chain. Especially useful material in the present invention is polyisobutylene. Polybutene-1 and polypropylene are also preferred hydrocarbon substituents for preparing dispersants.

Sulfonated EPDM and EPT rubbers are also of interest as viscosity index improvers. The excellent viscometrics of these materials is attributed to the effect of temperature upon the ionic association equilibrium. The reaction of sulfomaleic anhydride or its derivatives with EPDM can also produce sulfonate (and carboxylate) sites on EPDM's. The resulting products and their metal or amine (ammonium) salts are useful as VI improvers.

The reaction of the sulfomaleic anhydride with the unsaturated hydrocarbon polymer can occur in solution, in a melt and in polymeric processing equipment, such as a rubber mill, a Brabender, an extruder or a Banbury mixer.

The adduct of sulfomaleic anhydride with the unsaturated hydrocarbon can be covalently bonded through its anhydride group with molecules containing polar groups. Such polar functionality molecules can be low molecular weight compounds, oligomers or polymers. Of particular interest are molecules containing amine or hydroxyl functionality. The reaction of the polyamine with the sulfomaleic adduct with unsaturated hydrocarbon polymer will form amides (imides) and the reaction with a polyols compound will form esters. Polyamines or polyols provide polarity to form molecules with a polar head and a hydrocarbon tail in addition to the ionic sulfonate group.

The polyamines of the instant invention have about 2 to about 30 carbon atoms, more preferably about 2 to about 20, and most preferably about 4 to about 12. Typical examples of suitable polyamines are ethylene diamine, diethylene triamine, triethylene tetramine, tetraethylene pentamine, and N,N-dimethyl ethylene diamine.

The sulfonic acid group of the sulfomaleic anhydride can be neutralized with ammonia, primary, secondary or tertiaryy amines, including the aforementioned amino compounds, or metal counterion selected from the group consisting of iron, lead, aluminum and Groups IA, IIA, IB and IIB of the Periodic Table of Elements. The neutralization of the sulfonic acid groups of the sulfomaleic anhydride adduct of the unsaturated hydrocarbon polymer can be accomplished either in solution, in a melt or in polymeric processing equipment, as previously defined.

The oil soluble reaction products of the invention can be incorporated in a wide variety of oleaginous compositions. They can be used in lubricating oil compositions, such as automotive crankcase lubricating oils, automatic transmission fluids, etc., in concentrations generally within the range of about 0.01 to 20 weight percent, e.g., 0.1 to 10 weight percent, preferably 0.3 to 3.0 weight percent, of the total composition. The lubricants to which the products can be added include not only hydrocarbon oils derived from petroleum but also include synthetic lubricating oils, such as polyethylene oils, alkyl esters of dicarboxylic acid, complex esters of dicarboxylic acid, polyglycol and alcohol, alkyl esters of carbonic or phosphoric acids, polysilicones, fluorohydrocarbon oils, mixtures of mineral lubricating oil and synthetic oils in any proportion, etc.

When the products of this invention are used as multifunctional additives having detergency and anti-rust properties in petroleum fuels, such as gasoline, kerosene, diesel fuels, No. 2. fuel oil and other middle distillates, a concentration of the additive in the fuel in the range of 0.001 to 0.5 weight percent, based on the weight of the total composition, will usually be employed.

When used as an antifoulant in oil streams in refinery operations to prevent fouling of process equipment, such as heat exchangers, or in turbine oils, about 0.001 to 2 weight percent will generally be used.

The additive may be conveniently dispensed as a concentrate comprising a proportion of the additive, e.g., 20 to 90 parts by weight, dissolved in a proportion of a mineral lubricating oil, e.g., 10 to 80 parts by weight, with or without other additives being present.

In the above compositions or concentrates other conventional additives may also be present, including dyes, pour point depressants, antiwear agents, such as tricresyl phosphate or zinc dialkyldithiophosphates of 3 to 8 carbon atoms in each alkyl group, antioxidants, such as N-phenyl alpha-naphthylamine, tert-octylphenol sulfide, 4,4'-methylene bis-(2,6-di-tert butyl phenol), deemulsifiers, such as polysiloxanes, ethoxylated polymers and the like.

DESCRIPTION OF THE PREFERRED EMBODIMENTS

The following Examples illustrate the present invention without, however, limiting the same hereto.

EXAMPLE 1

EPDM Rubber With Sulfomaleic Anhydride

A solution of 50 g of dry EPDM rubber (Vistalon 2504) in 1 liter of dry xylene was heated and stirred under nitrogen and 2.67 g (15 mmole) of sulfomaleic anhydride was added and heating continued for 4 hours.

After cooling the sulfonic acid was neutralized and the anhydride reacted with excess methylamine (21.2 g). The polymer solution became extremely viscous and began to climb the stirrer, indicating that a polymeric methylammonium sulfonate ionomer had been formed. Methanol (50 ml) was added to attenuate the strong intermolecular associations and the viscosity gradually decreased.

After standing overnight the polymer was precipitated in a high speed mixer with 4,000 ml of isopropyl alcohol-water (70:30), collected on a filter and washed again in the mixer with another portion of IPA-water.

A small quantity of Irganox 1010 antioxidant was added and the polymer filtered and vacuum dried at 50° C.

Microanalysis indicated that the resulting product contained 0.46% S (14.4 mmole/100 g) and 0.265% N (18.9 mmole/100 g).

Treatment of a solution of the modified polymer in 95:5 toluene:methanol with excess sodium methoxide in methanol to free ionically bound methylamine and isolation gave a product whose analysis showed 0.40% S (12.5 mmole/100 G) and 0.115% N (8.2 mmole/100 g).

EXAMPLE 2

EPDM Rubber With Chlorosulfonyl Maleic Anhydride

According to the method of Example 1, 2.95 g of chlorosulfonylmaleic anhydride was reacted with 50 g of Vistalon 2504 EPDM rubber, followed by reaction of the sulfonyl chloride and carboxylic anhydride groups with excess methylamine. The polymer was isolated and cleaned as in Example 1.

Microanalysis indicated the presence of 0.46% S (14.3 mmole/100 g) and 0.359% N (25.6 meq/100 g). Some gelation of the polymer product was observed.

Treatment of this polymer with sodium methoxide solution and isolation as in Example 1 gave a product whose microanalysis showed 0.39% S (12.2 mmole/100 g) and 0.194% N (13.8 mmole/100 g).

EXAMPLE 3

Butyl Rubber With Chlorosulfonyl Maleic Anhydride

According to the method of Example 1, 2.95 g of chlorosulfonyl maleic anhydride was reacted with 50 g of Butyl rubber (Exxon 365 Butyl rubber). After treatment with methylamine the isolated polymer contained 0.47% S (14.7 mmole/100 g) and 0.468% N (33.4 mmole/100 g). Further reaction with sodium methoxide gave a polymer whose elemental analysis showed a 0.45% S (14.0 mmole/100 g) and 0.215% N (15.3 mmole/100 g).

EXAMPLE 4

EPDM Rubber With 2-Chloroformyl-3-Sulfoacrylic Anhydride

According to the method of Example 1, 50 g of EPDM (Vistalon 2504) and 2.95 g of 2-chloroformyl-3-sulfoacrylic anhydride were reacted. After treatment with methylamine the isolated polymer contained 0.40% S (12.5 mmole/100 g) and 0.445% N (31.8 mmole/100 g). After treatment with sodium methoxide the isolated polymer gave the following microanalysis: 0.52% S (16.3 mmole/100 g) and 0.205% N (14.6 mmole/100 g).

EXAMPLE 5

EPDM Rubber With the Methyl Ester of Chlorosulfonyl Maleic Anhydride

Chlorosulfonyl maleic anhydride was reacted with one molar equivalent of methanol in chloroform solution. The chloroform was removed under vacuum and 3.43 g of the resulting product was reacted with 50 g of Vistalon 2504 EPDM according to the method of Example 1. After treatment with methylamine the isolated polymer, according to microanalysis, contained 0.38% S (11.9 mmole/100 g) and 0.179% N (12.8 mmole/100 g). After treatment with sodium methoxide the analysis showed 0.36% S (11.2 mmole/100 g) and 0.089% N (6.4 mmole/100 g).

EXAMPLE 6

Conjugated Diene Butyl with Sulfomaleic Anhydride

According to the method of Example 1, 2.67 g of sulfomaleic anhydride was reacted with 50 g of CD Butyl 7614. After treatment with methylamine and isolation the product contained 0.38% S (11.9 mmole/100 g) and 0.248% N (17.7 mmole/100 g).

EXAMPLE 7

Bulk Reaction of EPDM With Sulfomaleic Anhydride

Vistalon 2504 EPDM (50 g) was fluxed on a 3" electric mill at 120° C. Sulfomaleic anhydride (1.05 g) was added slowly. After the the addition was complete the sample was mixed for a new minutes and zinc stearate (2.35 g) was added and mixing continued for a few minutes longer.

That resulting product was a tough, elastic material that resembled a crosslinked rubber. However, the product was soluble in 95:5 toluene:methanol, indicating that the product was a thermoplastic elastic "ionomer".

EXAMPLE 8

Aminopropyl Morpholine Derivative of EPDM-Sulfomaleic Anhydride Adduct

Sulfomaleic anhydride (2.67 g) was reacted with 50 g of Vistalon 2504 EPDM according to the method of Example 1. After 1 hour heating was discontinued, then 7.21 g of aminopropyl morpholine was added at 110° C. The reaction mixture became extremely viscous and was difficult to stir. Methanol addition (50 ml) cut the viscosity appreciably. The mixture was cooled and stirred for 1 hour; then it was precipitated in 4 liters 70:30 IPA:water in a high speed mixer and washed twice in the mixer with two portions of IPA containing a small quantity of antioxidant. The dried polymer was analyzed, redissolved, reprecipitated as before, dried and reanalyzed. This procedure was repeated again. Finally, a solution of the twice-purified polymer was treated with sodium methoxide, precipitated, washed and isolated as before. The results are tabulated below.

| Vistalon 1504 + Sulfomaleic Anhydride Treated with Aminopropylmorpholine | | | | |
|---|---|---|---|---|
| Purification | % S | Meq S/100 g Polymer | % N | Meq N/ 100 g Polymer |
| Initial Product | 0.38 | 11.9 | 0.415 | 29.6 |
| First Reprecip. | 0.44 | 13.7 | 0.329 | 23.5 |
| Second Reprecip. | 0.36 | 11.2 | 0.282 | 20.1 |
| Sodium Methoxide | | | | |
| Treatment of | 0.34 | | 0.128 | |
| Second Reprecip. | 0.30 | | 0.150 | |
| | 0.32 | 9.98 | 0.139 | 9.92 |

EXAMPLE 9

Tetraethylene Pentamine Derivative of EPDM-Sulfomaleic Anhydride Adduct

According to the Method of Example 8, tetraethylene pentamine was substituted for n-aminopropyl morpholine. Some crosslinking was apparent. The results are tabulated below.

Vistalon 2504 EPDM + Sulfomaleic Anhydride
Reacted With Tetraethylene Pentamine

| Purification | % S | Meq S/100 g Polymer | % N | Meq N/ 100 g Polymer |
| --- | --- | --- | --- | --- |
| Initial Product | 0.477 | | 1.161 | |
| | 0.45 | | 1.170 | |
| | 0.46 | 14.3 | 1.166 | 83.2 |
| First Reprecip. | 0.49 | | 0.850 | |
| | 0.52 | | 0.841 | |
| | 0.505 | 15.7 | 0.846 | 60.4 |
| Second Reprecip. | 0.43 | | 0.829 | |
| | 0.42 | | 0.838 | |
| | 0.425 | 13.3 | 0.834 | 59.5 |
| Sodium Methoxide Treatment | 0.42 | | 0.582 | |
| Second Reprecip. | 0.47 | | 0.584 | |
| | 0.445 | 13.9 | 0.583 | 41.6 |

EXAMPLE 10

Aminopropyl Morpholine Derivative of Low Molecular Weight EPDM-Sulfomaleic Anhydride Adduct Example 8 was repeated using a low molecular weight (8 Mooney) EPDM. The results are tabulated below.

| Purification | % S | Meq S/100 g Polymer | % N | Meq N/ 100 g Polymer |
| --- | --- | --- | --- | --- |
| Initial Product | 0.25 | 7.80 | 0.392 | 28.1 |
| First Reprecip. | 0.24 | 7.48 | 0.273 | 19.4 |
| Second Reprecip. | 0.22 | 6.86 | 0.262 | 18.7 |
| Sodium Methoxide Treatment | 0.25 | | 0.114 | |
| Second Reprecip. | 0.24 | | 0.114 | |
| | 0.245 | 7.64 | 0.114 | 8.14 |

EXAMPLE 11

Aminopropyl Morpholine Derivative of EPDM-Methoxysulfonyl Maleic Anhydride

The methyl sulfonate ester of maleic anhydride

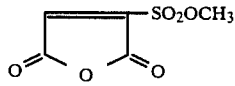

was reacted with 50 g of Vistalone 22504 EPDM in 1,000 ml xylene at about 130° C. for 4 hours and 5.19 g of N-(3-aminopropyl) morpholine was added. A viscosity increase was noted, stirring was continued overnight.

The adduct was precipitated in 5 liters of IPA in a high speed mixer, washed twice with 2 liter portions of IPA and dried overnight in vacuum at 50° C.

The product was analyzed, dissolved in 1,500 ml 95:5 toluene:methanol and precipitated in 8 liters 70:30 IPA:H₂O, washed with IPA, dried and analyzed. The product was redissolved and reprecipitated once more.

The twice reprecipitated product was treated with sodium methoxide according to the method of Example 1. The results are tabulated below.

| Purification | % S | Meq S/100 g Polymer | % N | Meq N/ 100 g Polymer |
| --- | --- | --- | --- | --- |
| Initial Product | 0.76 | 23.7 | 0.818 | 58.4 |
| First Reprecip. | 0.73 | 22.8 | 0.688 | 49.1 |
| Second Reprecip. Sodium Methoxide | 0.75 | 23.4 | 0.651 | 46.5 |
| Treatment of Second Reprecip. | 0.66 | 20.6 | 0.605 | 43.2 |
| | 0.69 | 21.5 | 0.624 | 44.6 |
| | | 21.1 | | 43.9 |

EXAMPLE 12

Polyisobutylene with Sulfomaleic Anhydride

About 250 g of polyisobutylene ($\overline{M}n$ {90}) was dissolved in 200 ml xylene at room temperature under a nitrogen blanket. To the stirred xylene solution was gradually added 60 g of sulfomaleic anhydride at about 35° C. The reaction mixture was refluxed for about 8 hours and then concentrated by roto-evaporation. The residue was taken up in 2.5 L of ether and washed twice with 500 ml portions of water. The ether solution was dried over MgSO₄, filtered and concentrated by roto-evaporation. The dried sulfomaleated product analyzed for 0.33% sulfur and showed a strong anhydride carbonyl adsorption band at ca. 5.6 microns in the infrared.

EXAMPLE 13

Tetraethylenepentamine (TEPA) Derivative of Polyisobutylene-Sulfomaleic Anhydride Adduct Twenty grams of the adduct obtained in Example 12 were aminated with 1.9 g of TEPA by heating a mixture of the reactants at 165° C. for about 4 hours. The resulting product featured an infrared spectrum with a strong imide carbonyl absorption band at ca. 5.9 microns, and analyzed for 2.6% nitrogen. The product was diluted with an equal weight of mineral oil (solvent 150N) for bench testing.

EXAMPLE 14

Additive Testing

In Table 1 below the products of this invention were evaluated for varnish potency in the VIB (Varnish Inhibition Bench) test. Comparative tests with prior art products were also conducted. These tests are described below.

In the VIB test a test sample consisting of 10 g of lubricating oil containing the additive being evaluated is used. The test oil is a commercial a lubricating oil obtained from a taxi after 2,000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about 2 cycles per minute. During the heating phase a gas containing a mixture of 0.7 volume percent SO₂, 1.4 volume percent NO and the balance air was bubbled through the test samples and during the cooling phase water vapor was bubbled through the test samples. At the end of the test period, which testing cycle can be repeated as necessary to determine the inhibiting effect of any additive, the wall surfaces of the test flasks in which the samples were contained are visually evaluated as to varnish inhibition. The amount of varnish deposited on the walls is rated as a numerical value of from 1 to 10, with the higher number reflecting the greater amount of varnish. It has been found that this test correlates with the varnish results obtained from ASTM-MS-VC engine tests.

EXAMPLE 15

Evaluation of Candidate Additives in the VIB Test

A series of VIB evaluations were carried out to measure the potency of several of the additives of the present invention as varnish inhibitors. Included in the testing of comparative purposes are two additives, CA-1 and CA-2, which are representative of commercially available products used to control sludge and varnish in engines. CA-1 is a polyisobutenyl succinimide dispersant made by aminating polyisobutenyl succinic anhydride ($\overline{M}n=900$) with tetraethylene pentamine. CA-2 is a multifunctional viscosity modifier (MFVM) obtained by free radical grafting of 2-vinylpyridine onto ethylene-propylene (EP) copolymer. In evaluating the relative activities of the commercial-type additives and the additives of the present invention similar treat levels of additive were employed. These results are illustrated in the table below.

TABLE I

Varnish Inhibition Bench (VIB) Test Results on Candidate Additives

| Additive | % N | VBI Rating |
|---|---|---|
| Dispersant | | |
| Example 13 | 1.3 | 3 |
| CA-1 | 1.58 | 7 |
| MFVM | | |
| Example 8 | 0.42 | 3 |
| Example 8 | 0.33 | 3 |
| Example 10 | 0.39 | 3 |
| Example 10 | 0.26 | 3 |
| CA-2 | 0.3 | 4 |
| | | 10 |

The data clearly indicate that the dispersant and MFVM additives of the instant invention control varnish more effectively than the corresponding commercial type of dispersant or MFVM additives.

What is claimed is:

1. A covalently bonded reaction product of polymer comprising:
   (a) a sulfomaleic anhydride adduct with an unsaturated hydrocarbon polymer, wherein said unsaturated hydrocarbon polymer is selected from the group consisting of ethylene propylene terpolymers, ethylene diene copolymers, propylene diene copolymers, polyisoprene, Butyl rubber, polybutadiene and styrenebutadiene, and styrene-isoprene random and block copolymers, polypropylenes and polyisobutylenes, and the sulfonic acid groups of the sulfomaleic anhydride adduct with the unsaturated hydrocarbon polymer are neutralized with a metal counterion selected from the group consisting of iron, aluminum, lead and Groups IA, IIA, IB and IIB of the Periodic Table of Elements; and
   (b) a polar molecule containing at least one primary or secondary amino group.

2. The polymer adduct of claim 1 wherein the sulfomaleic derivative or isomer is selected from the group including halosulfonyl maleic anhydride, alkoxysulfonyl maleic anhydrides, halocarbonyl-B-sulfoacrylic anhydrides, alkyl or aryl silyl oxysulfonyl maleic anhydrides.

3. A polymer according to claim 1 wherein said polar molecule is selected from the group consisting of polyamines having about 2 to about 30 carbon atoms.

4. A polymer according to claim 1 wherein said polar molecule is aminopropyl morpholine.

5. A polymer according to claim 1 wherein said polar molecule is tetraethylene pentamine.

6. A polymeric solution comprising a hydrocarbon liquid and about 0.01 to about 90 weight percent of a covalently bonded reaction product of:
   (a) a sulfomaleic anhydride adduct with an unsaturated hydrocarbon polymer, wherein said unsaturated hydrocarbon polymer is selected from the group consisting of ethylene propylene terpolymers, ethylene diene copolymers, propylene diene copolymers, polyisoprene, Butyl rubber, polybutadiene and styrenebutadiene, and styrene-isoprene random and block copolymers, polypropylenes and polyisobutylenes and the sulfonic acid groups of the sulfomaleic anhydride adduct with the unsaturated hydrocarbon polymer are neutralized with a metal counterion selected from the group consisting of iron, aluminum, lead and Groups IA, IIA, IB and IIB of the Periodic Table of Elements; and
   (b) a polar molecule containing at least one primary or secondary amino group.

7. A lubricating oil comprising an oil and about 0.01 to about 20 percent of a covalently bonded reaction product of:
   (a) a sulfomaleic anhydride adduct with an unsaturated hydrocarbon polymer, wherein said unsaturated hydrocarbon polymer is selected from the group consisting of ethylene propylene terpolymers, ethylene diene copolymers, propylene diene copolymers, polyisoprene, Butyl rubber, polybutadiene and styrenebutadiene, and styrene-isoprene random and block copolymers, polypropylenes and polyisobutylenes and the sulfonic acid groups of the sulfomaleic anhydride adduct with the unsaturated hydrocarbon polymer are neutralized with a metal counterion selected from the group consisting of iron, aluminum, lead and Groups IA, IIA, IB and IIB of the Periodic Table of Elements; and
   (b) a polar molecule containing at least one primary or secondary amino group.

* * * * *